(No Model.)  2 Sheets—Sheet 1.

T. B. ATTERBURY.
MOLD FOR FORMING GLASS ARTICLES.

No. 275,562. Patented Apr. 10, 1883.

Witnesses:

Inventor:

(No Model.) 2 Sheets—Sheet 2.

T. B. ATTERBURY.
MOLD FOR FORMING GLASS ARTICLES.

No. 275,562. Patented Apr. 10, 1883.

Witnesses: Inventor:

UNITED STATES PATENT OFFICE.

THOMAS B. ATTERBURY, OF PITTSBURG, PENNSYLVANIA.

MOLD FOR FORMING GLASS ARTICLES.

SPECIFICATION forming part of Letters Patent No. 275,562, dated April 10, 1883.

Application filed February 13, 1883. (No model.)

*To all whom it may concern:*

Be it known that I, THOMAS B. ATTERBURY, a citizen of the United States, residing at Pittsburg, in the county of Allegheny and State of Pennsylvania, have invented certain new and useful Improvements in Molds for Forming Glass Articles; and I do hereby declare the following to be a full, clear, and exact description of the invention, such as will enable others skilled in the art to which it appertains to make and use the same.

My invention relates more particularly to improvements in molds for the manufacture of glass lamp bowls or founts in which an annular flange or ring is formed in the upper outer edge of the bowl of sufficient height to catch any oil which may be accidentally spilled onto the bowl in filling the lamp or which may drip down from the wick-tube or burner, so that such oil will not be liable to run down onto the stem or stand on which the lamp may be placed.

My invention is designed as an improvement on the patent to John Bridges of July 23, 1872, No. 129,781, in which patent an annular ring, located in the upper portion of the mold-cavity, is depressed or forced downward during the operation of forming the article, to form an annular depression or groove in the upper face of the bowl or globe for catching the waste oil; but such depression or groove in the bowl is objectionable for the reason that it is liable to become clogged up and cannot be very easily cleaned, while the inwardly-projecting flange formed in making the groove renders it almost impossible to free the inside of the lamp-bowl from dirt or water.

My invention therefore consists in forming in the upper portion of the mold a movable annular portion, which shall give form and shape to the entire or a greater portion of the upper surface or top of the lamp, said annular portion or band being seated in a recess and adapted to be depressed or forced down during the blowing operation, so that the top of the glass article while yet at a welding-heat will be folded down upon the upper portion of the sides thereof, and an annular flange formed around the upper edge of the bowl, fount, or other article.

Figure 1:
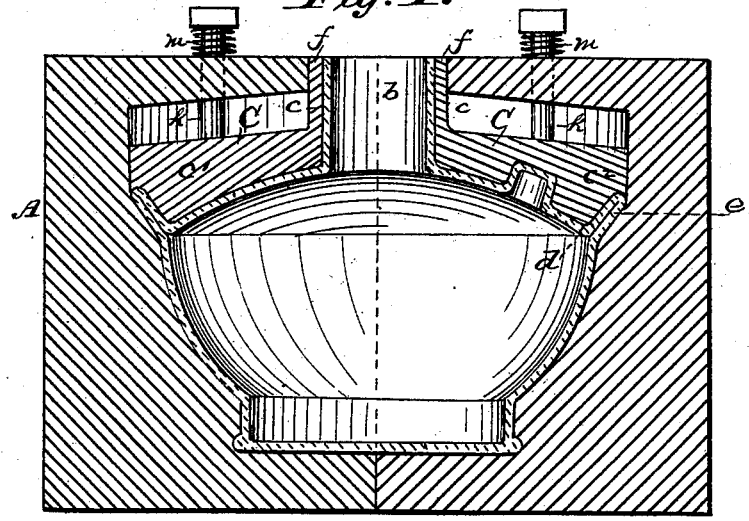
Figure 2:
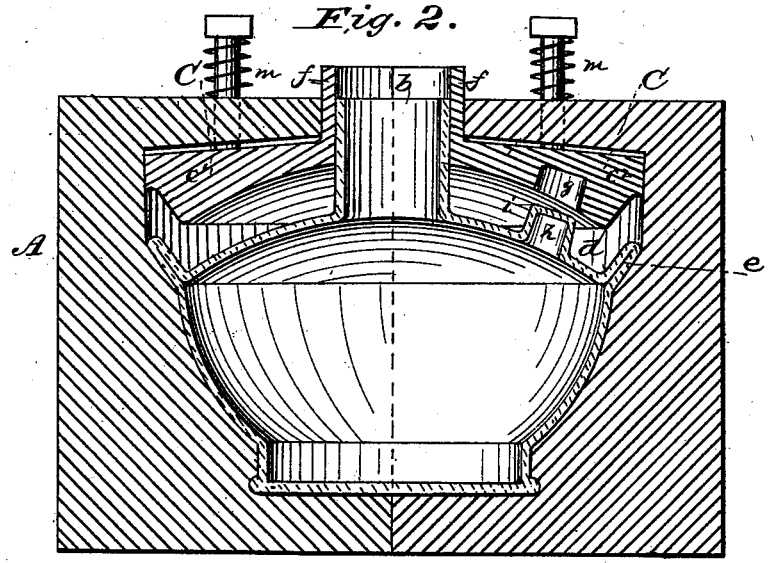
Figure 3:
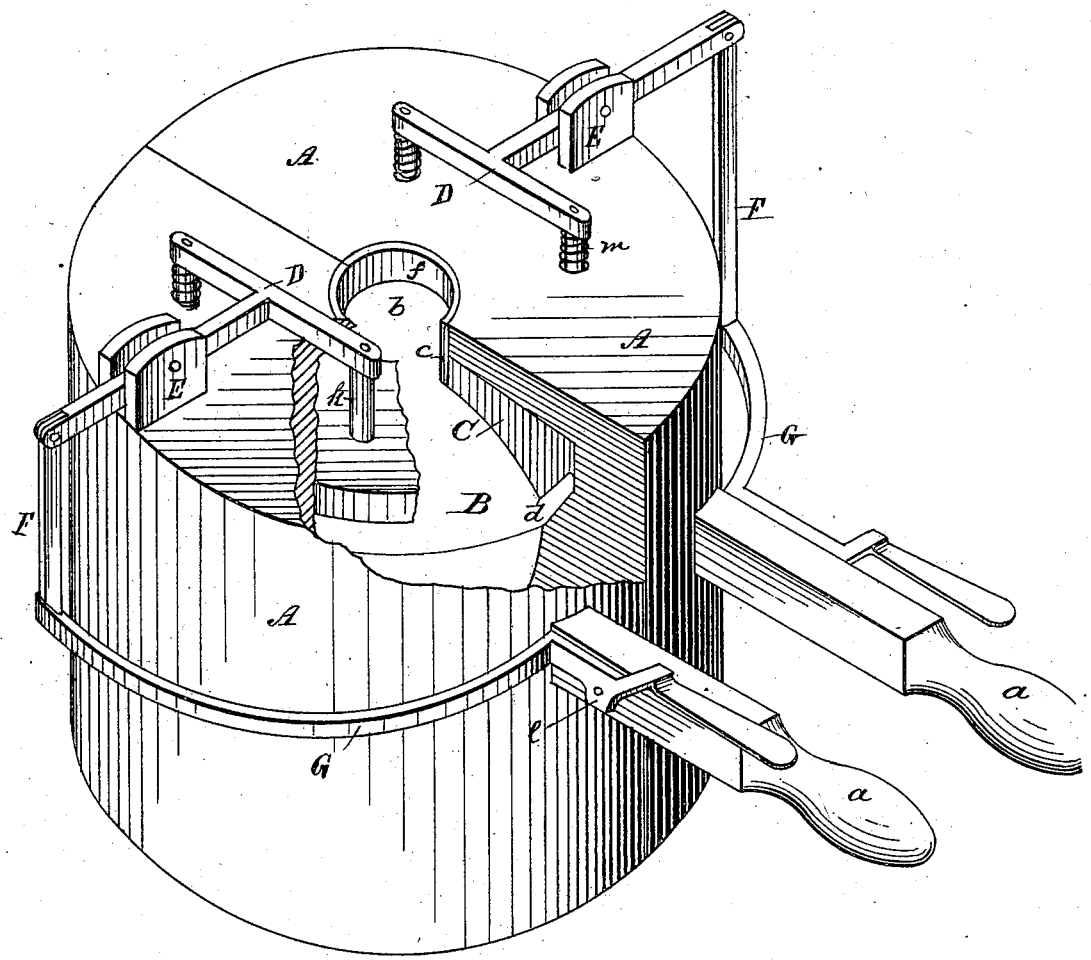
Figure 4:
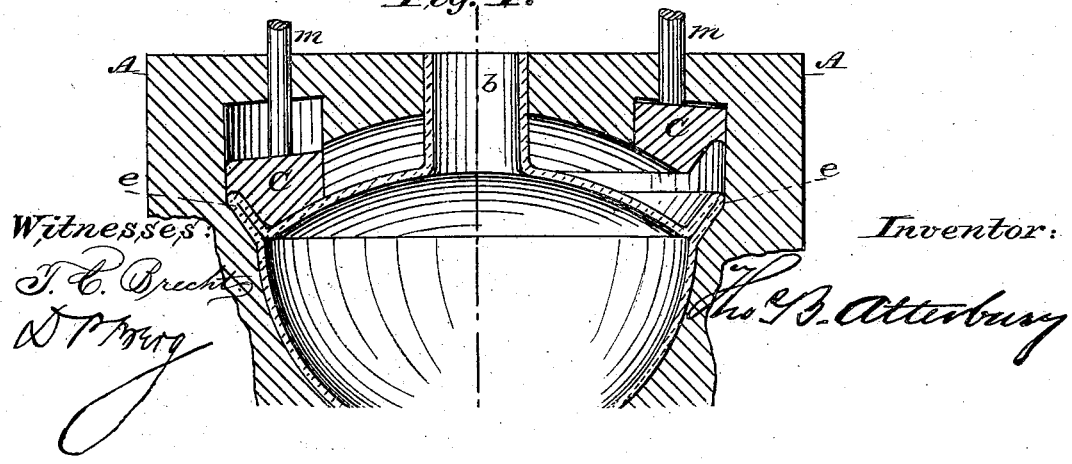

Referring to the drawings, Figure 1 is a sectional view, showing the movable top portion of the mold as depressed. Fig. 2 is a similar view, showing the movable top portion as elevated. Fig. 3 is a view in perspective, with a portion broken away to show the interior of the mold. Fig. 4 is a view in section of a modification.

A A indicate the two sections of the mold, hinged together in the usual manner, and having the cavity B of any suitable or desirable configuration in peripheral outline to form the article desired.

$a\ a$ indicate the handles by which the mold is opened and closed, and the usual base-plate or stand may be employed at the bottom. The blowing is done in the usual manner through the opening $b$ in the top of the mold.

The upper portion of the mold-cavity is recessed at $c$ to receive the movable top or segmental ring C, said ring being divided and secured to the top of the mold by devices, which will be more fully hereinafter described, so as to open and close with the mold-sections. The ring or movable top C, as before stated, is divided into two sections, $c'\ c^2$, so that when the mold is closed they come together end to end and form a complete top to the mold-cavity, and is made to conform to the shape which it is desired to give to the top portion of the article, and to this end it may be provided with depressions or elevations to give to the top any desired ornamentation, as bands, rings, &c.

The lower portion or face of the movable top or ring is provided with a portion, $d$, which projects downward into the mold-cavity farther than the other portions of its surface, and tapers or slopes back to the outer edge of the ring, so that when the ring is depressed the point or projection $d$ will come in contact with the molten glass which is being blown into shape and fold it down while at a welding-heat onto the sides of the article, thus producing a ledge or rim, $e$, on the upper outer edge of the article of a double thickness of glass.

The inner edges of the annular rings or movable top, $c'\ c^2$, terminate in upwardly-projecting flanges $f$, which extend up to the top of the mold, so that the recess $c$ will be at all times closed, and thus prevent the molten glass from being blown therein to interfere with the rising motion of the rings. The flanges $f$ may be made to extend some little distance above the top of the mold, even when the rings are depressed, so that there will be no shoulders, offsets, or projections formed in the blowing-orifice of the mold to catch the glass and hold the rings, and prevent their being readily drawn up by the action of the springs.

The segment $c^2$ of the ring C is provided with a cavity, $g$, into which the molten glass is blown or forced by the pressure of the air exerted in the process of forming the article, so as to form an upwardly-projecting cavity, $h$, in the top of the article, which, when the film or top portion, $i$, is removed, will form a filling cavity or an opening through which the oil can be supplied to the lamp.

The movable top or ring C is made and set in the cavity $e$ in such a manner as to be capable of a vertical motion at least as great as the vertical depth to be given to the flange $e$, so that at the highest point of elevation the movable top will stand clear of the upper face of the article and permit the mold to be opened and the article to be removed, while the downward motion is such that when down the point $d$ will extend into the mold-cavity B far enough to form the flange $e$.

Various devices for raising and lowering the rings of the movable top C may be employed, and in the use of such movable top I do not limit myself to any particular devices.

As one mode of operating the movable top I have shown the sections of the top, $c'$ $c^2$, attached to stems $k$, which project up through the top of the mold.

The stems $k$ are attached at their upper ends to the inner ends of the branching or T levers D; or a lever may extend from each to an arm or projection, E, on each half of the mold in which they are pivoted. The outer ends of the T levers D are connected to the rods F F, which in turn are connected to the inner ends of the bent levers G G, which in turn are pivoted to the handles $a$ $a$ of the mold at $l$. The levers G G extend forward near the handles $a$, so that they can be conveniently operated by the person who manipulates the mold.

Spiral or other springs $m$ are arranged on the stems $k$ between the top of the mold and the levers D D, which, when no pressure is applied to said levers, will cause the movable top to rise into the cavity $e$, while, on the other hand, when pressure is applied to the ends of the levers G G to depress them the springs will be compressed and the movable top of the mold forced downward.

The mode of operation is as follows: The blower takes a gather of glass on the blow-pipe and centers it within the mold in the usual manner. The mold is now closed and the blowing operation proceeded with until the cavity B is quite or nearly filled with the inflated glass. The movable top of the mold is now forced down by the action of the levers G G, bringing said movable top in contact with the glass and crimping or folding the top of the molten-glass article down onto the sides or walls of the article while at a welding-heat, and thus forming the flange or projection $e$.

I do not wish to be understood as limiting myself to the manufacture of lamp bowls or founts, for it is obvious that fruit-jars, aquarium-founts, and an endless variety of articles can be formed in this manner, whether the flange be formed for a guard, or drip-flange, or for ornamental purposes.

The advantages of my invention are obvious. Suffice it to say, however, that an ordinary workman or glass-blower can form the articles in one operation, producing a blown glass globe or bowl with a pressed flange or projection thereon.

In Fig. 4 I have shown a modification, in which only a portion of the top is movable. Said portion consists of annular rings fitted in a cavity in the top of the mold, and adapted to be thrust downward to form the flange on the article; but this form is more fully embraced in the patent to Bridges, heretofore referred to, of which I am owner, and need not be described more fully at this time.

Having thus described my invention, what I claim, and desire to secure by Letters Patent, is—

1. A glass-mold of the character described, the molding-cavity of which is provided with a supplemental top, movable toward and from the main portion of the mold-cavity, as set forth.

2. A glass-mold of the character described, the molding-cavity of which is provided with a movable top confined in a recess within the walls of the mold, and adapted to be moved toward and from the molding-cavity, as set forth.

3. A mold for forming glass articles of the character described, having the divided annular top C located in the upper portion of the mold-cavity, and adapted to have a vertical movement in said mold-cavity, as set forth.

4. A glass mold of the character described, having in the upper portion of the cavity thereof a movable top, which gives form to the top of the article by being pressed down thereon during the blowing operation, as set forth.

5. A mold for forming glass articles, having the divided annular top or ring C located in the upper portion of and forming the top of the mold-cavity, said ring being provided with annular flanges $f f$, which project up through and form the walls of the blowing-orifice of the mold, as set forth.

6. The combination of the movable top C of the mold-cavity, provided with the flanges $f$ and pins $k$, with the springs $m$, levers D and G, and bars F, as and for the purpose set forth.

In testimony whereof I affix my signature in presence of two witnesses.

THOS. B. ATTERBURY.

Witnesses:
D. P. BERG,
G. STENGEL.